June 9, 1936.  W. L. MORRISON  2,043,626
ARM REST
Filed Oct. 3, 1932  3 Sheets-Sheet 1
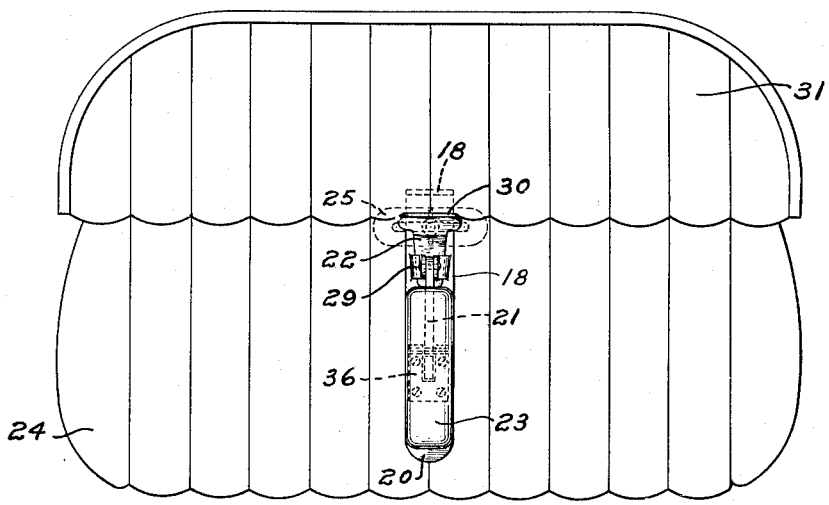
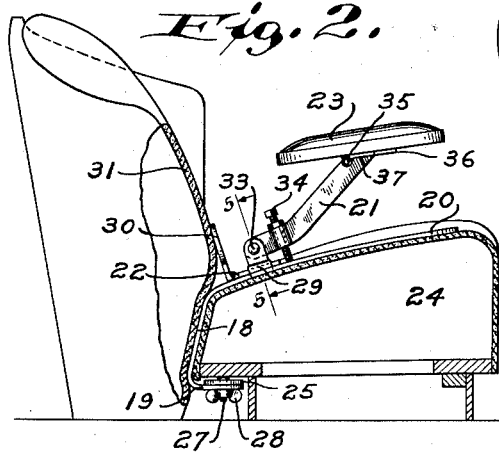
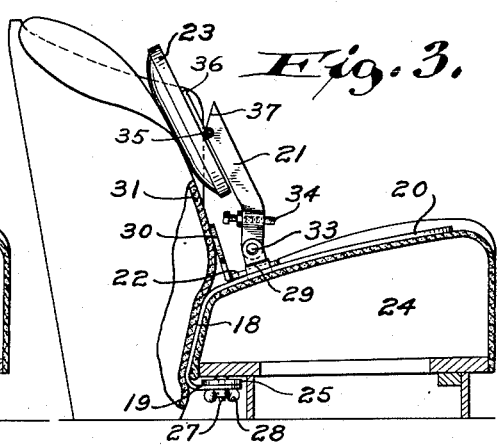
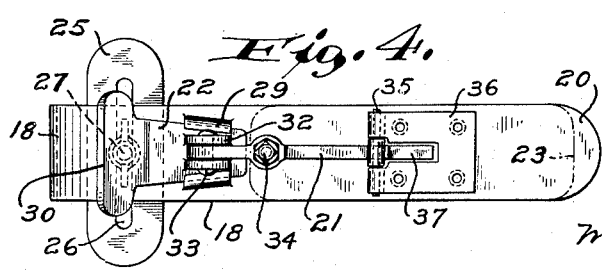
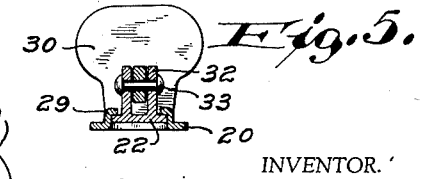
INVENTOR.
W. L. Morrison
BY
Morsell, Lieber & Morsell
ATTORNEYS.

June 9, 1936.  W. L. MORRISON  2,043,626
ARM REST
Filed Oct. 3, 1932  3 Sheets-Sheet 2
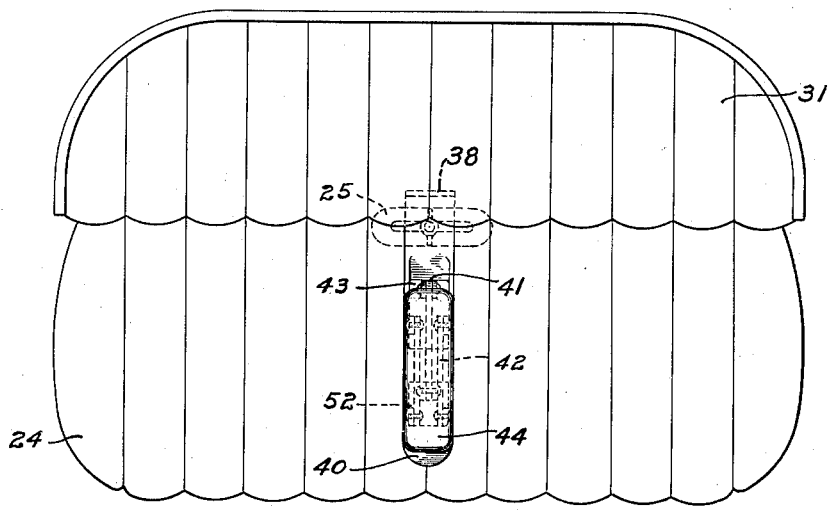
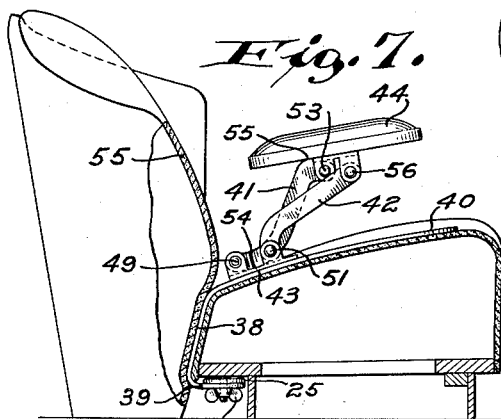
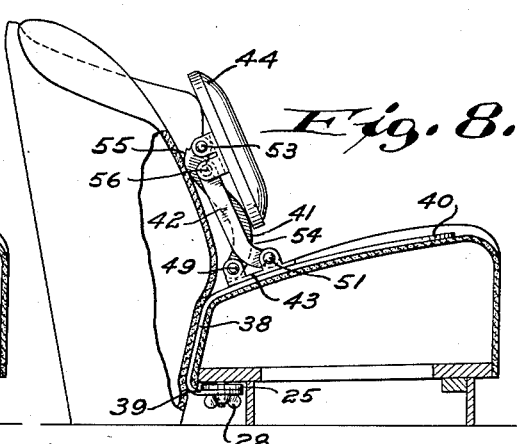
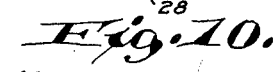
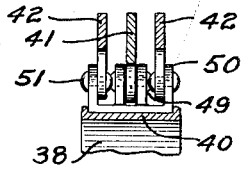
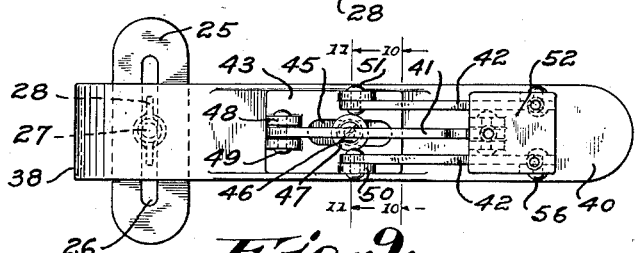
INVENTOR.
W. L. Morrison
BY
Morsell, Lieber & Morsell
ATTORNEYS.

June 9, 1936. W. L. MORRISON 2,043,626
ARM REST
Filed Oct. 3, 1932 3 Sheets-Sheet 3
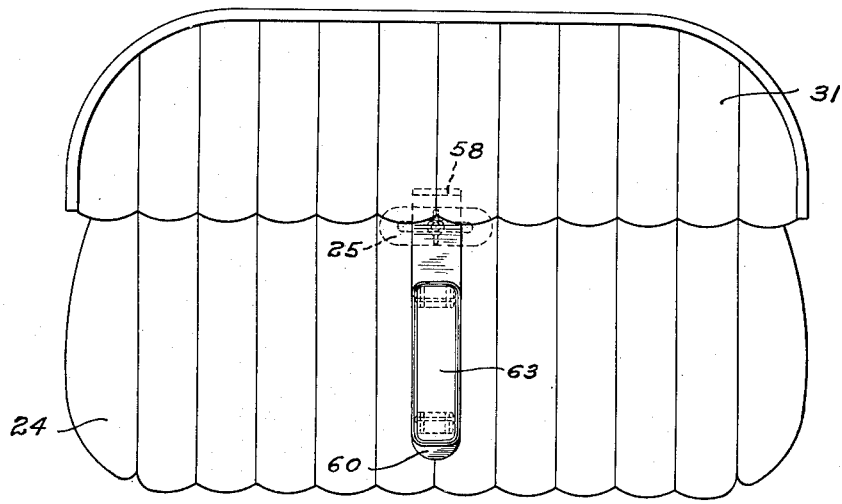
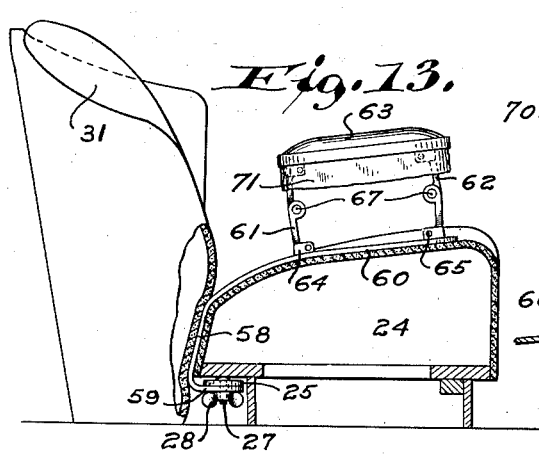
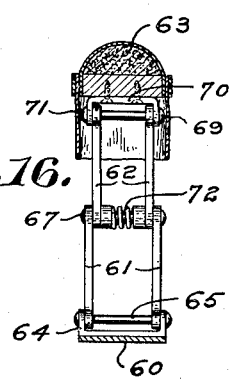
INVENTOR.
W. L. Morrison
BY
Morsell, Lieber & Morsell
ATTORNEYS.

Patented June 9, 1936

2,043,626

UNITED STATES PATENT OFFICE 2,043,626

ARM REST

Willard L. Morrison, Lake Forest, Ill.

Application October 3, 1932, Serial No. 635,906

6 Claims. (Cl. 155—112)

The present invention relates generally to improvements in arm rests especially associable with the seats of vehicles or the like.

An object of the invention is to provide an arm rest which is adjustably associable with the standard seats of any vehicle or the like, either at the end or at any intermediate portion of the seat.

Another object of the invention is to provide means for rigidly but detachably attaching an arm rest to the seat of a vehicle, without damaging the upholstery.

A further object of the invention is to provide an arm rest which is readily displaceable or collapsible so as to permit the user of a seat with which the device is associated, to occupy and leave the seat with minimum interference or obstruction.

Still another object of the invention is to provide a simple, compact and highly attractive arm rest which may be conveniently applied as an accessory to any standard upholstered or cushion vehicle seat.

Another object of the invention is to provide a rigid arm rest structure for cushion seats, which will not interfere with or undesirably partake of the resiliency or springing motion of the seat with which it cooperates, but which will comfortably accommodate the arm pressure.

A further object of the invention is to provide a new and useful detachable arm rest for vehicle seats, which may be adjusted to insure maximum comfort for the user, and which may be manufactured and sold at minimum cost.

Still another object of the invention is to provide an arm rest structure which may be attached to or removed from a seat, without in any manner marring or otherwise damaging the supporting elements.

Another object of the invention is to provide various improvements in the details of construction of arm rests for vehicle seats or the like, whereby the effectiveness of such devices is enhanced to a maximum.

These and other objects and advantages will be apparent from the following detailed description.

A clear conception of several embodiments of the invention and of the mode of constructing and of utilizing arm rests built in accordance therewith, may be had by referring to the drawings accompanying and forming a part of this specification in which like reference characters designate the same or similar parts in the various views.

Fig. 1 is a full top view of a standard automobile seat showing one form of the improved arm rest applied thereto;

Fig. 2 is a side view of the arm rest and seat of Fig. 1, showing the rest in operative position and a portion of the seat in section;

Fig. 3 is a similar side view of the arm rest and seat, showing the arm rest swung back to inoperative position;

Fig. 4 is an enlarged top view of the device of Figs. 1, 2 and 3, with the arm engaging portion removed;

Fig. 5 is a similarly enlarged transverse section through the arm rest of Figs. 1, 2 and 3, taken along the line 5—5 of Fig. 2;

Fig. 6 is a full top view of a standard automobile seat showing another form of the improved arm rest associated therewith;

Fig. 7 is a side view of the modified form of arm rest showing the same in inoperative position of adjustment;

Fig. 8 is a similar side view of the modified arm rest and seat, showing the arm rest swung rearwardly to inoperative position;

Fig. 9 is an enlarged top view of the modified device of Figs. 6, 7 and 8, with the arm engaging portion thereof removed;

Fig. 10 is a similarly enlarged transverse section through the device of Fig. 9, taken along the line 10—10;

Fig. 11 is a similarly enlarged transverse section through the device of Fig. 9, taken along the line 11—11 of Fig. 9;

Fig. 12 is a full top view of a standard automobile seat showing still another form of the improved arm rest associated therewith;

Fig. 13 is a side view of the modified arm rest of Fig. 12, showing the same in normal operative position;

Fig. 14 is an enlarged part sectional side elevation of the modified arm rest of Figs. 12 and 13;

Fig. 15 is a similarly enlarged part sectional side view of the modified arm rest of Fig. 14, showing the same in lowered position; and Fig. 16 is a transverse section through the modified arm rest of Fig. 14, the section being taken along the line 16—16 of Fig. 14.

While the invention has been disclosed herein as being especially applicable to advantage, to the front standard upholstered seat of an ordinary automobile, it will be apparent that the various features are more generally applicable to seats of various kinds, and the specific showing herein made is not intended to be an unnecessary limitation as to the scope of the invention.

Referring specifically to the embodiment of the invention illustrated in Figs. 1 to 5 inclusive, the arm rest comprises in general a main U-shaped bracket 18 having a lower reaction arm 19 and an upper supporting arm 20; a carrier member 21 having its lower end pivotally but detachably associated with the upper rear portion of the bracket 18 by means of an intervening bracket 22; and an arm engaging element or rest 23 pivotally attached to the upper end of the member 21.

The bracket 18 may be formed of a single piece of relatively stiff but resilient band iron or steel adapted to snugly engage the rear and upper portion of a standard upholstered vehicle seat 24, and the lower reaction arm 19 is provided with an adjustable bearing plate 25 having a longitudinal slot 26 cooperable with a clamping bolt 27 carried by the arm 19 of the bracket. The bearing plate 25 may be shifted laterally of the bracket 18 so as to permit disposition of the latter at either end of the seat 24 or at any intermediate portion thereof, without sacrificing bearing surface, and the plate 25 may be locked in adjusted position by means of a wing nut 28 coacting with the bolt 27.

The upper supporting arm 20 of the bracket 18 is preferably of considerable length so as to afford considerable bearing surface on top of the seat 24, and the rear part of the arm 20 is provided with integral relatively tapered lugs 29 with which the base of the pivot bracket 22 is detachably cooperable. The rear of the bracket 22 may be provided with a bearing plate 30 which is adapted to bear directly against the rear or back 31 of the seat 24 so as to hold the bracket 22 in firm coaction with the lugs 29. The pivot bracket 22 is thus removable from the main bracket 18 by pushing the plate 30 backwardly, either by compressing the seat back 31 or by moving the seat 24 forwardly. The pivot bracket 22 is moreover provided with spaced ears 32 carrying a pivot 33 upon which the lower end of the carrier member 21 is swingably supported.

The medial portion of the carrier member 21 is provided with an adjustable stop screw 34 which is engageable with the top of the bracket arm 20 to limit the downward swinging motion of the arm rest, and the arm engaging portion or rest 23 is swingably attached to the upper end of the member 21 by a pivot pin 35 coacting with a plate 36 attached to the bottom of the rest 23. The rest 23 may be upholstered and finished to present a neat appearance, and when in use, the rest 23 engages an inclined stop surface 37 at the upper extremity of the swinging carrier member 21.

The operation and mode of applying the improved arm rest of Figs. 1 to 5 inclusive, should be clearly apparent from the foregoing description, the device being shown in normal operative position in Fig. 2, and in swung-back or inoperative position in Fig. 3. The height of the arm engaging rest 23 may be readily varied by manipulating the screw 34, and when the rest 23 and member 21 are swung to the position of Fig. 3, there is no objectionable obstruction to entering or leaving the seat 24. The entire rest 23, member 21 and bracket 22 may be removed as an assembed unit, without removing the bracket 18, by merely moving the pivot bracket 22 out of engagement with the retainer lugs 29, thus permitting the seat 24 to be utilized without an arm rest while at the same time making the rest quickly available.

Referring specifically to the embodiment of the invention illustrated in Figs. 6 to 11 inclusive, the modified arm rest comprises in general a main U-shaped bracket 38 having a lower reaction arm 39 and an upper supporting arm 40; a set of carrier members or links 41, 42 having their lower ends detachably pivotally associated with the upper rear portion of the bracket 38 through an intervening pivot bracket 43; and an arm engaging element or rest 44 pivotally supported by the upper ends of the links 41, 42.

The main bracket 38 is similar in construction, to the bracket 18 previously described, and the lower reaction arm 39 of the bracket 38 may likewise be provided with an adjustable bearing plate 25 having a longitudinal slot 26 cooperable with a clamping bolt 27 and with a wing nut 28. The upper supporting arm 40 of the bracket 38 is again formed of considerable length so as to afford a relatively rigid support and the pivot bracket 43 has its base provided with a slot 45 cooperable with a relatively short central boss on the arm 40 and with a clamping screw 46 and washer 47 to permit locking of the brackets 38, 43 to each other in any desired position of adjustment, while also permitting entire removal of the pivot bracket 43. The pivot bracket 43 is provided with a pair of rearwardly disposed central ears 48 to which the lower end of the central carrier member or link 41 is pivotally attached by means of a pivot 49, and also has two more widely spaced forwardly disposed side ears 50 to which the lower ends of the side carrier members or links 42 are pivotally attached by alined pivots 51.

The upper end of the central link 41 is pivotally attached to the rest supporting plate 52, by means of a pivot 53, and this link 41 is of greater length than the links 42. The lower portion of the link 41 is provided with a lower stop surface 54 which is engageable with the base of the pivot bracket 43, and also has an upper stop surface 55 engageable with the rest 44 when in operative position as clearly illustrated in Fig. 7. The upper ends of the side links 42 are pivotally attached to the rest supporting plate 52, by means of alined pivots 56, and these links 42 are swingable past the central link 41 to cause tilting of the rest 44 as shown in Fig. 8, in order to withdraw the parts from the seat 24 and to position the same near the back 31.

The operation and mode of applying the modified arm rest of Figs. 6 to 11 inclusive, should also be clearly apparent from the foregoing description, the modified device being shown in normal operative position in Fig. 7. While no specific means for varying the height of the rest 44, has been shown, a stop screw 34 such as shown in Fig. 2 and associated with the link 41 of Fig. 7, may be utilized if desired. When the rest 44 and links 41, 42 are swung upwardly and rearwardly to the position shown in Fig. 8, the arm rest offers minimum obstruction to entering and leaving the seat 24, and if so desired, the rest 44, links 41, 42, and the pivot bracket 43 may be removed as a unit, by merely removing the clamping screw 46. The slot 45 in the pivot bracket 43 affords simple means for permitting forward or rearward adjustment of the rest 44 relative to the fixed relatively short central boss 40' of the arm 40, and the slot 26 again facilitates disposition of the device near either end of the seat 24.

Referring specifically to the embodiment of the invention illustrated in Figs. 12 to 16 inclusive, the further modified arm rest comprises in general a main U-shaped bracket 58 having a lower reaction arm 59 and an upper supporting arm 60; a set of carrier toggles consisting of lower links 61 and upper links 62 the former of which are pivotally associated at their lower ends with the supporting arm 60 and at their upper ends with the links 62; and an arm engaging element or rest 63 pivotally attached to the upper ends of the upper links 62.

The main bracket 58 is similar in construction to the bracket 18 previously described, and the reaction arm 59 is also preferably provided with an adjustable bearing plate 25 having an elongated slot 26 cooperable with a clamping bolt 27 and wing nut 28. The lower toggle links 61 are swingably attached to brackets 64 secured to the bracket arm 60, by means of pivots 65, and are provided with abutments 66 which are engageable with the brackets 64 to limit the swinging motion of the links. The lower and upper links 61, 62 are pivotally interconnected by alined pivot pins 67, and the upper extremities of the upper links 62 are attached to brackets 68 secured to the rest 63, by means of pivots 69 and also have abutments 70 for limiting the swing. The pad or rest 63 may be provided with a fabric apron 71 for concealing the toggles when collapsed, as shown in Fig. 15. The toggle pins 67 may also be provided with friction springs 72 for holding the toggles in adjusted position.

The mode of applying and of operating the further modified arm rest of Figs. 12 to 16 inclusive, should likewise be clearly apparent from the foregoing description, the modified device being shown in normal operative position in Fig. 14, and in lowered position in Fig. 15. When the rest 63 has been lowered to the position of Fig. 15, the pad may be utilized as a low arm rest, and offers little obstruction to entering and leaving the seat 24. When elevated the toggles automatically retain the rest 63 in elevated position by virtue of the pins 67 passing beyond center, and lowering may be readily effected by merely pushing the pins 67 toward each other and thereby collapsing the toggles.

From the foregoing description, it will be apparent that the improvement provides a simple, compact and highly efficient arm rest which is readily attachable to any standard upholstered vehicle seat without marring or damaging the same. The improved device may be readily removed to permit free entering or leaving of a seat to which it is applied, and such removal may be either temporary or permanent. The rest or arm supporting portion may be swung upwardly and rearwardly against the seat back 31 in the manner shown in the drawings, or it may be moved sidewise if so desired. The rest may also be removed entirely from the supporting bracket without removing the latter, or the entire accessory may be readily removed whenever desired. The improved appliance, may furthermore be positioned at any portion of the seat, and has proven highly successful in actual use.

It should be understood that it is not desired to limit the invention to the exact details of construction and to the precise mode of operation of devices herein shown and described, for various modifications within the scope of the claims may occur to persons skilled in the art.

It is claimed and desired to secure by Letters Patent:

1. An arm rest for a seat having a removable seating cushion and a back cooperating with the cushion, said arm rest comprising a bracket having an upper arm extending forwardly over and in direct contact with the top of the cushion and a lower arm extending forwardly beneath the cushion and a portion connecting the upper and lower arms and disposed between the rear of the cushion and the back of the seat, an arm rest normally disposed above and spaced from the top of the cushion, and a plurality of carrier members having their upper ends pivotally attached to said arm rest and having their lower ends pivotally attached to means on the rear portion of said upper bracket arm, certain of said members being formed with means cooperable with said arm rest to support the latter in normal position and to permit swinging movement of said arm rest rearwardly toward and into substantially parallel position relative to said back when said arm rest is not in use.

2. An arm rest for a seat having a removable seating cushion and a back cooperating with the cushion, said arm rest comprising a one-piece resilient bracket having an upper arm extending forwardly over and in direct contact with the top of the cushion and a lower arm extending forwardly beneath the cushion and a portion connecting the upper and lower arms and disposed between the rear of the cushion and the back of the seat, an arm rest normally disposed above and spaced from the top of the cushion, a plurality of carrier members having their upper ends pivotally attached to said arm rest, at least one of said members having means providing a stop cooperable with said arm rest for normally supporting the latter, and means for removably and pivotally connecting the lower ends of said members to the rear portion of said upper bracket arm, said members being simultaneously swingable and relatively movable to cause said arm rest to move toward and into substantial parallelism with said back when said arm rest is not in use.

3. An arm rest for a seat having a removable seating cushion and a back cooperating with the cushion, said arm rest comprising a one-piece resilient bracket having an upper arm extending forwardly over and in direct contact with the top of the cushion and a lower arm extending forwardly beneath the cushion and a portion connecting the upper and lower arms and disposed between the rear of the cushion and the back of the seat, an arm-engaging element normally disposed above and spaced from the top of the cushion, a plurality of carrier members having their upper ends pivotally attached to said arm-engaging element, at least one of said members having means providing a stop cooperable with said arm-engaging element for normally supporting the latter, means for removably and pivotally connecting the lower ends of said members to the rear portion of said upper bracket arm, and means providing another stop between at least one of said members and means on its supporting structure.

4. An arm rest for a seat having a removable seating cushion and a back cooperating with the cushion, said arm rest comprising a bracket having means for attachment to the rigid portion of the seat and having an upper arm extending forwardly over and in direct contact with the top of the cushion, an arm rest normally disposed above and spaced from the top of the cushion, and a plurality of carrier members having their upper ends pivotally attached to said arm rest and having their lower ends pivotally attached to means on the rear portion of said upper bracket arm, certain of said members being formed with means cooperable with said arm rest to support the latter in normal position and to permit swinging movement of said arm rest rearwardly toward and into substantially parallel position relative to said back when said arm rest is not in use.

5. An arm rest for a seat having a removable seating cushion and a back cooperating with the cushion, said arm rest comprising a one-piece resilient bracket having means for attachment to the rigid portion of the seat and having an upper arm extending forwardly over and in direct contact with the top of the cushion, an arm rest normally disposed above and spaced from the top of the cushion, a plurality of carrier members having their upper ends pivotally attached to said arm rest, at least one of said members having means providing a stop cooperable with said arm rest for normally supporting the latter, and means for removably and pivotally connecting the lower ends of said members to the rear portion of said upper bracket arm, said members being simultaneously swingable and relatively movable to cause said arm rest to move toward and into substantial parallelism with said back when said arm rest is not in use.

6. An arm rest for a seat having a removable seating cushion and a back cooperating with the cushion, said arm rest comprising a one-piece resilient bracket having means for attachment to the rigid portion of the seat and having an upper arm extending forwardly over and in direct contact with the top of the cushion, an arm-engaging element normally disposed above and spaced from the top of the cushion, a plurality of carrier members having their upper ends pivotally attached to said arm-engaging element, at least one of said members having means providing a stop cooperable with said arm-engaging element for normally supporting the latter, means for removably and pivotally connecting the lower ends of said members to the rear portion of said upper bracket arm, and means providing another stop for the lower portion of at least one of said members.

WILLARD L. MORRISON.